US012356189B2

(12) United States Patent
Lüscher et al.

(10) Patent No.: US 12,356,189 B2
(45) Date of Patent: Jul. 8, 2025

(54) UWB ACCESS RIGHTS UPDATE

(71) Applicant: dormakaba Schweiz AG, Rümlang (CH)

(72) Inventors: André Lüscher, Meilen (CH); Paul Studerus, Oberweningen (CH)

(73) Assignee: DORMAKABA SCHWEIZ AG, Rümlang (CH)

( * ) Notice: Subject to any disclaimer, the term of this patent is extended or adjusted under 35 U.S.C. 154(b) by 530 days.

(21) Appl. No.: 17/285,355

(22) PCT Filed: Oct. 17, 2019

(86) PCT No.: PCT/EP2019/078281
§ 371 (c)(1),
(2) Date: Apr. 14, 2021

(87) PCT Pub. No.: WO2020/083750
PCT Pub. Date: Apr. 30, 2020

(65) Prior Publication Data
US 2021/0377738 A1 Dec. 2, 2021

(30) Foreign Application Priority Data
Oct. 22, 2018 (CH) .................... 01281/18

(51) Int. Cl.
H04L 12/08 (2006.01)
H04W 12/08 (2021.01)

(52) U.S. Cl.
CPC .................. *H04W 12/08* (2013.01)

(58) Field of Classification Search
CPC .................. H04W 12/08
See application file for complete search history.

(56) References Cited

U.S. PATENT DOCUMENTS 7,991,998 B2 * 8/2011 Rosner .............. H04L 63/104
713/168
10,064,012 B1 * 8/2018 Boston .............. G01S 1/0428
(Continued)

FOREIGN PATENT DOCUMENTS

CN 1809971 A 7/2006
EP 0618550 A1 10/1994
(Continued)

OTHER PUBLICATIONS

International Search Report and Written Opinion of the International Searching Authority for International Application No. PCT/EP2019/078281, mailed on Jan. 24, 2020, in 15 pages.

(Continued)

Primary Examiner — Vance M Little
(74) Attorney, Agent, or Firm — Knobbe, Martens, Olson & Bear, LLP

(57) ABSTRACT

An access control terminal (1), comprising an electronic circuit (11) and an ultra-wide-band transceiver (10) connected to the electronic circuit (11) wherein the electronic circuit (11) exchanges messages with a mobile device (2) to determine a distance (d) of the mobile device (2) from the access control terminal (1), and to transmit to the mobile device (2) one or more update messages configured to update access rights data in the mobile device (2), if the mobile device (2) is within the pre-determined proximity range (P).

15 Claims, 3 Drawing Sheets

(56) References Cited

U.S. PATENT DOCUMENTS

| | | | | |
|---|---|---|---|---|
| 2004/0240565 | A1* | 12/2004 | Santhoff | H04L 25/4902 |
| | | | | 375/259 |
| 2007/0139191 | A1* | 6/2007 | Quatro | G06Q 10/08 |
| | | | | 340/539.2 |
| 2013/0174223 | A1* | 7/2013 | Dykeman | G06F 21/10 |
| | | | | 726/4 |
| 2014/0179227 | A1* | 6/2014 | Nousiainen | G06Q 10/10 |
| | | | | 455/41.2 |
| 2016/0014103 | A1* | 1/2016 | Masters | G07C 9/00571 |
| | | | | 340/5.61 |
| 2018/0285089 | A1* | 10/2018 | Khakpour | H04W 12/084 |
| 2021/0385653 | A1* | 12/2021 | Sau | H04W 12/63 |

FOREIGN PATENT DOCUMENTS

| | | |
|---|---|---|
| FR | 2842237 A1 | 1/2004 |
| WO | WO 2005/024734 A1 | 3/2005 |
| WO | WO 2006/021047 A1 | 3/2006 |
| WO | WO 2007/073969 A1 | 7/2007 |
| WO | WO 2014/191551 A1 | 12/2014 |

OTHER PUBLICATIONS

First Office Action issued in CN Application No. 201980067721.5 mailed Mar. 6, 2024 (11 pages with translation).

* cited by examiner

UWB ACCESS RIGHTS UPDATE

CROSS-REFERENCE TO RELATED APPLICATIONS

This application is the U.S. National Phase under 35 U.S.C. § 371 of International Application No. PCT/EP2019/078281, filed Oct. 17, 2019, which claims priority to CH Application No. 01281/18, filed Oct. 22, 2018, the entire contents of each of which are incorporated by reference herein and made a part of this specification.

FIELD OF THE INVENTION

The present invention relates to an access control terminal. Specifically, the present invention relates to an access control terminal, comprising an electronic circuit and an ultra-wideband transceiver, a method of updating access rights, and a computer program product for updating access rights.

BACKGROUND OF THE INVENTION

Keyless entry systems have become widely used in applications ranging from vehicle entry systems and vehicle access control, to building and room access control. For very close-range applications, a radio-frequency identification (RFID) transponder (or tag) is often used, which has mostly replaced earlier magnetic stripe cards. For applications which do not require a very close range, other wireless technologies such as Bluetooth and ultra-wideband radio have emerged.

The network topologies of access control systems typically comprise a central access rights server to which each access control terminal is connected. An access control device held by a user is brought close to an access control terminal for wireless exchange of credentials. These credentials are then transmitted from the access control terminal to the server, which performs a look-up in a database of access rights. If access is granted, the server sends a signal to the access control terminal, which allows the user access through an electronically controlled doorway. The disadvantage of this topology is that it requires each access control terminal to be permanently connected to the server, which is associated with considerable cost in wiring and presents a single point of failure. More modern access control systems have relegated access control decisions to the access control terminals themselves. If these access control terminals are not connected to the server, however, the issue then arises of how and when to update the database of access rights in each access control terminal.

Other access rights systems invert the situation by storing a database or table of the user's access rights in the access control devices themselves. At an access control point, the access control terminals and the access control devices exchange data containing an identifier of the access control terminal and the user's access rights at that access control point. Access control devices must be cheap and small, and therefore a disadvantage of these systems is that they typically have only a limited memory, and therefore for a large access control system comprising a large number of access control points, the user's access rights table cannot be stored in the access control device in its entirety. Similarly, updating access rights becomes cumbersome as every affected party must have its access control device updated with new access rights.

SUMMARY OF THE INVENTION

It is an object of this invention to provide an access control terminal and a method of updating access rights, which do not have at least some of the disadvantages of the prior art.

According to the present invention, these objects are achieved through the features of the independent claims. In addition, further advantageous embodiments follow from the dependent claims.

An access control terminal comprises an electronic circuit and an ultra-wideband transceiver connected to the electronic circuit. According to the present invention, the above-mentioned objects are particularly achieved in that the electronic circuit is configured to transmit, via the ultra-wideband transceiver, to a mobile device a request message and to receive, via the ultra-wideband transceiver, from the mobile device a response message. The electronic circuit is further configured to determine a distance of the mobile device from the access control terminal, using the response message, and to determine, using the distance, if the mobile device is within a pre-determined proximity range, and to transmit to the mobile device one or more update messages configured to update access rights data in the mobile device, if the mobile device is within the pre-determined proximity range.

In an embodiment, the electronic circuit is configured to determine the distance using a time difference between transmitting the request message and receiving the response message.

In an embodiment, the electronic circuit is configured to include in the access rights data access control point rights, which grant a user of the mobile device access at certain access control points, and/or access control point times, which grant the user of the mobile device access at certain access control points at certain times and/or for a certain periods of time.

In an embodiment the electronic circuit is configured to transmit to the mobile device one or more update messages using the ultra-wideband transceiver, a Bluetooth transceiver, a WLAN transceiver, and/or a mobile cellular transceiver.

In an embodiment the electronic circuit is further configured to determine and store a plurality of distances of the mobile device from the access control terminal, to determine, using the plurality of distances, a predicted path of the mobile device, and to transmit, via the ultra-wideband transceiver, the one or more update messages configured to update the access rights data in the mobile device, if the predicted path of the mobile device is within the proximity range for a predetermined update period.

In addition to an access control terminal, the present invention also relates to a method of updating access rights between an access control terminal and a mobile device, the access control terminal comprising an electronic circuit and an ultra-wideband transceiver connected to the electronic circuit. The method comprises transmitting, by the electronic circuit via the ultra-wideband transceiver, a request message to the mobile device. The method further comprises receiving, by the electronic circuit via the ultra-wideband transceiver, a response message from the mobile device. The method further comprises determining, in the electronic circuit, using the response message, a distance of the mobile device from the access control terminal. The method further comprises determining, in the electronic circuit, using the distance, if the mobile device is within a pre-determined proximity range, and transmitting, from the electronic circuit to the mobile device one or more update messages configured to update access rights data in the mobile device, if the mobile device is within the pre-determined proximity range.

In an embodiment, the method comprises determining, in the electronic circuit, the distance using a time difference between transmitting the request message and receiving the response message.

In an embodiment, the method comprises including, by the electronic circuit, in the access rights data access control point rights, which grant a user of the mobile device access at certain access control points, and/or access control point times, which grant the user of the mobile device access at certain access control points at certain times and/or for a certain periods of time.

In an embodiment, the method further comprises the electronic circuit transmitting, to the mobile device, one or more update messages via the ultra-wideband transceiver, a Bluetooth transceiver, a WLAN transceiver, and/or mobile cellular transceiver.

In an embodiment, the method further comprises determining and storing, in the electronic circuit, a plurality of distances of the mobile device from the access control terminal. The method further comprises determining, using the plurality of distances, a predicted path of the mobile device. The method further comprises transmitting, via the ultra-wideband transceiver, the one or more update messages configured to update the access rights data in the mobile device, if the predicted path of the mobile device is within the proximity range for a predetermined update period.

In addition to an access control terminal and a method of updating access rights, the following invention also relates to a computer program product comprising a non-transitory computer readable medium having stored thereon computer code configured to control a processor of an access control terminal, comprising an ultra-wideband transceiver, to transmit, via the ultra-wideband transceiver, a request message to a mobile device and receive, via the ultra-wideband transceiver a response message from the mobile device. The computer code is further configured to control the processor to determine, using the response message, a distance of the mobile device from the access control terminal, and determine, using the distance, if the mobile device is within a pre-determined proximity range. The computer code is further configured to control the processor to transmit to the mobile device one or more update messages configured to update access rights data in the mobile device, if the mobile device is within the pre-determined proximity range.

In an embodiment, the computer program is configured to control the processor to determine, in the electronic circuit, the distance using a time difference between transmitting the request message and receiving the response message.

In an embodiment, the computer program is further configured to control the processor to include, by the electronic circuit, in the access rights data access control point rights, which grant a user of the mobile device access at certain access control points, and/or access control point times, which grant the user of the mobile device access at certain access control points at certain times and/or for a certain periods of time.

In an embodiment, the computer program is further configured to control the processor to transmit to the mobile device one or more update messages via the ultra-wideband transceiver, a Bluetooth transceiver, a WLAN transceiver, and/or mobile cellular transceiver.

In an embodiment, the computer program is further configured to control the processor to determine and store, in the electronic circuit, a plurality of distances of the mobile device from the access control terminal. The computer program is further configured to control the processor to determine, using the plurality of distances, a predicted path of the mobile device, and to transmit, via the ultra-wideband transceiver, the one or more update messages configured to update the access rights data in the mobile device, if the predicted path of the mobile device is within the proximity range for a predetermined update period.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
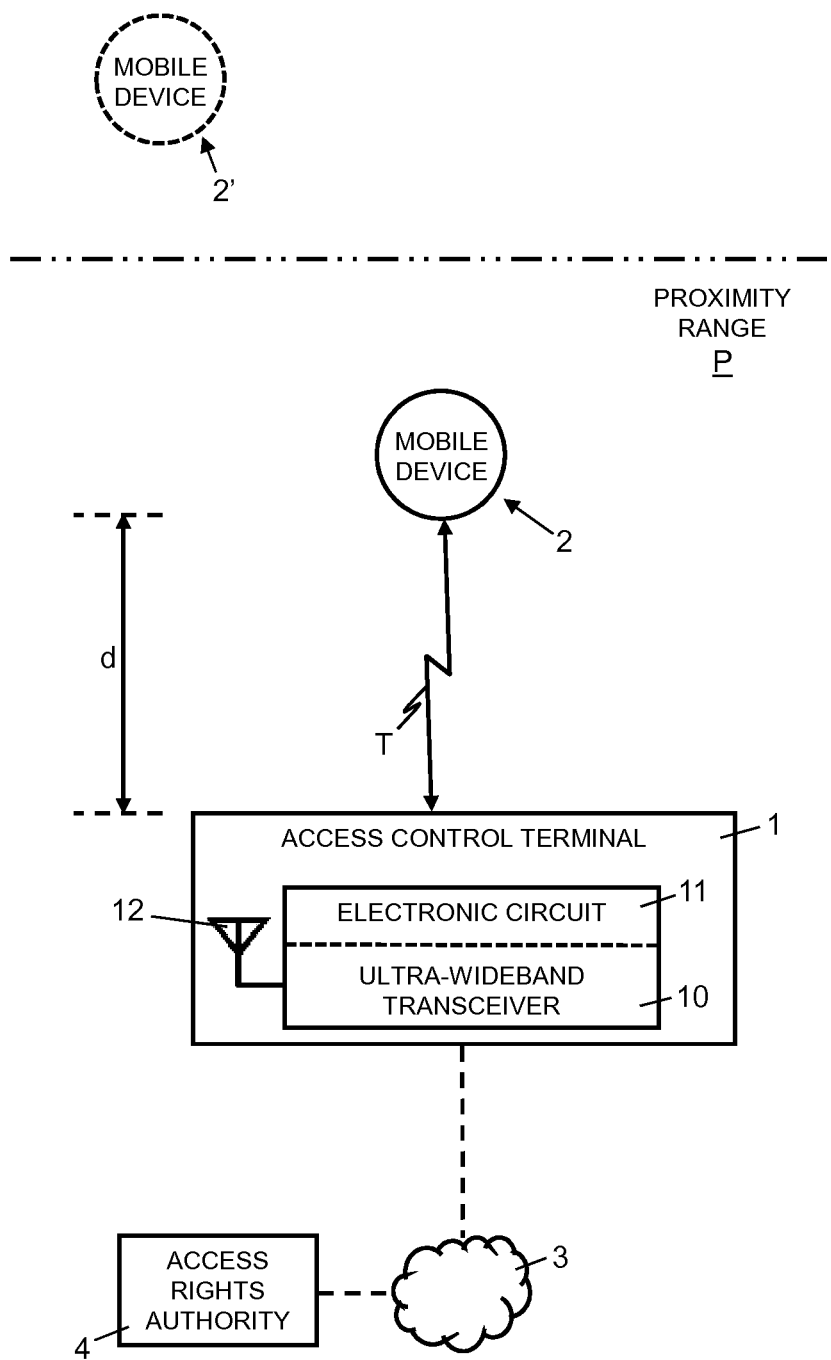
FIG. 1 shows a block diagram illustrating schematically a mobile device interacting with an access control terminal.
Figure 2:
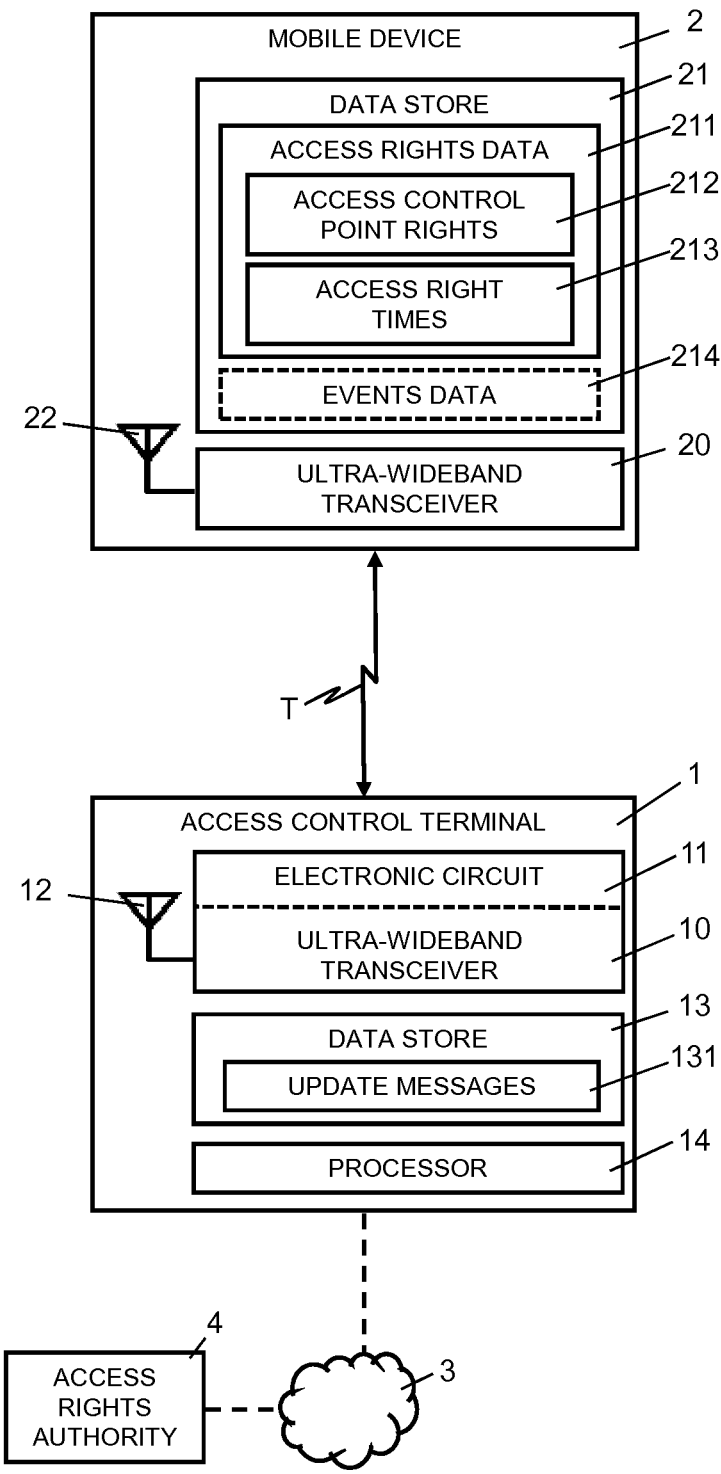
FIG. 2 shows a block diagram illustrating schematically a mobile device comprising a data store and an ultra-wideband transceiver, interacting with an access control terminal comprising an electronic circuit, an ultra-wideband transceiver, a data store, and a processor.
Figure 3:
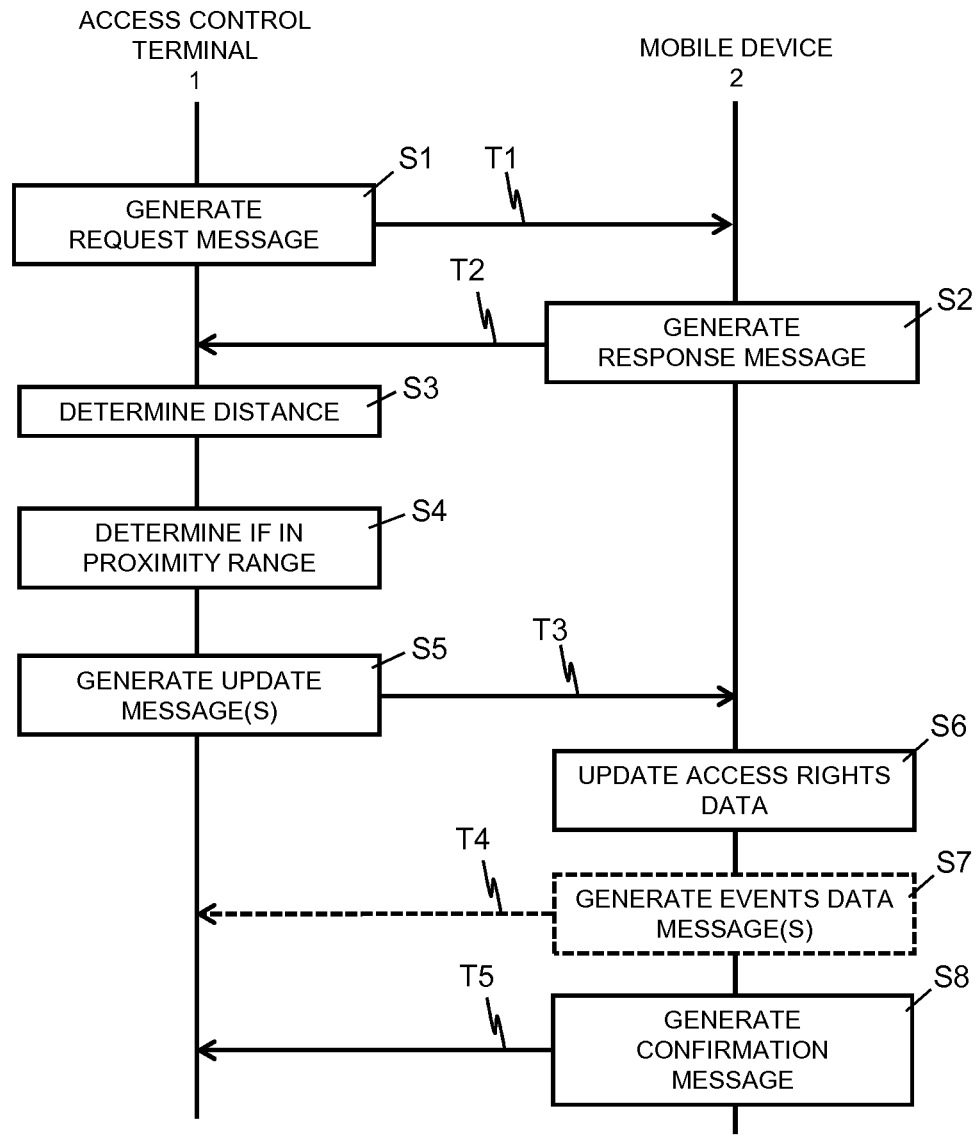
FIG. 3 shows a flow diagram illustrating an exemplary sequence of steps for updating access rights between an access control terminal and a mobile device and/or transmitting events data from the mobile device to the access control terminal.

In FIGS. 1, 2, and 3, reference numeral 1 refers to an access control terminal, which is an electronic device, mounted on or in a wall near a doorway, gate, or access control location, or incorporated into a door or gate itself. The access control terminal 1 further comprises an electronic circuit 11 connected to an ultra-wideband transceiver 10. The access control terminal 1 comprises an antenna 12 connected to the ultra-wideband transceiver 10. In an embodiment, the access control terminal 1 comprises a plurality of antennas 12, arranged such that a direction of a transmission from the mobile device 2 to the access control terminal 1 may be determined. The plurality of antennas 12 are arranged at a distance from each other such that the times of arrival of a transmission from a mobile device 2 to the plurality of antenna 12 are distinguishable from each other.

In FIGS. 1, 2, and 3, reference numeral 2 refers to a mobile device, which is an electronic communication device, such as a mobile radio telephone (cellular phone), a tablet computer, a laptop computer, a smart watch, or another operable portable/mobile electronic device comprising a battery powered electronic circuit, e.g. a programmed processor and/or an application specific integrated circuit (ASIC).

Reference character d refers to a distance between the mobile device 2 and the access control terminal 1.

Reference character T refers to an ultra-wideband transmission between the mobile device 2 and the access control terminal 1, or between the access control terminal 1 and the mobile device 2.

Reference character P refers to a proximity range, which is a distance from the access control terminal 1, or an area surrounding, adjacent to, or near the access control terminal 1. The proximity range P comprises the area of a room or a corridor, for example. In an embodiment, the proximity range P extends to a distance of up to 5 meters, preferably up to 10 meters, more preferably up to 20 meters from the access control terminal 1.

Reference numeral 2 refers to a mobile device situated inside the proximity range P of the access control terminal 1. Reference numeral 2' refers to a mobile device situated outside the proximity range P of the access control terminal 1.

In an embodiment, the mobile device 2, 2', is carried by a user, and as such can either be stationary or in motion with respect to the access control terminal 1. The mobile device 2, 2' can be carried in the hand of the user, but can also be carried in a garment or an accessory of the user, such as in a pocket or in a handbag. Due to the properties of ultra-wideband signals, the mobile device 2, 2' does not need to be within line-of-sight of the access control terminal 1.

Reference numeral 3 refers to a network, specifically a wired or wireless network which may comprise a plurality of networks such as a local area network (LAN), a wireless local area network (WLAN), a cellular network such GSM, and the Internet.

Reference numeral 4 refers to an access rights authority, which is a computer system comprising a memory on which access rights data is stored. The computer system implementing the access rights authority 4 may be a virtual cloud-based system, or a physical computer or server computer.

In the following paragraphs, described with reference to FIG. 2 are additional modules and components of the mobile device 2 and the access control terminal 1.

The mobile device 2 comprises an ultra-wideband transceiver 20 configured for communication via an antenna 22 with the electronic circuit 11 of the access control terminal 1, via the antenna 12 and the ultra-wideband transceiver 10. The mobile device 2 comprises a data store 21, specifically a memory module such as flash memory, EEPROM, or other non-volatile memory. The data store 21 has stored thereon access rights data 211, which comprises access control point rights 212 and access right times 213. Access rights 212 are associated with a user. The user is also associated with the mobile device 2. If the user switches to using a different mobile device 2, an authentication process takes place in which the association between the user and the different mobile device 2 is verified. If the association is affirmatively verified, the access rights 212 in the mobile device 2 are set in accordance to the user's access rights. Access control point rights 212 grant the user of the mobile device 2 access at certain access control points of an access control system. For example the user may be granted access at a particular set of access control points, but not others. Such access control points may be doorways or gates. Access control point times 213 grant the user of the mobile device 2 access at certain access control points at certain times and/or for a certain periods of time. For example, access control point times 213 may grant the user access during normal business hours, or may grant the user access for a limited period of time, such as one hour or one day. Access control point times 213 may grant the user access for only a limited number of times, such as once, or for only a limited number of times in a given time period, such as once per day.

In an embodiment, the data store 21 further comprises events data 214, which the mobile device 2 received from access control points. The events data 214 comprises information regarding the status of specific access control points and access log files of specific access control points. The status of the specific access control point indicates a battery level of the specific access control point, error messages describing error or warning events of the specific access control points, or further diagnostic information such as hardware identifiers and software identifiers. Access log files indicate which user's devices underwent access control at the specific access control point. Specifically, the events data 214 includes an identifier associated with a specific access control point, a timestamp representing the time an event occurred, and/or an event type.

The access control terminal 1 comprises a processor 14, specifically a microprocessor or Application-Specific Integrated Circuit (ASIC), further comprises a communications module (not shown) for communicating with the network 3. The access control terminal 1 further comprises a data store 13, specifically non-volatile memory such as flash or EEPROM memory. The data store 13 comprises update messages 131, which are data files or data packages for updating access rights data 211 in the mobile device 2 associated with the user.

In the following paragraphs, described with reference to FIG. 3 are the steps, functions, and operations performed by the access control terminal 1 or its processor 14 or the electronic circuit 11, respectively, and the mobile device 2, for exchanging updating access rights in the mobile device 2.

In Step S1, the access control terminal 1 or its processor 14 or electronic circuit 11, respectively, generates a request message. In an embodiment, the request message comprises an identifier of the access control terminal 1 and a nonce, which is an arbitrary number used once.

In transmission T1, the request message is transmitted from the access control terminal 1 to the mobile device 2. The mobile device 2 receives the request message via the antenna 22 and the ultra-wideband transceiver 20 of the mobile device 2.

In step S2, the mobile device 2 generates a response message using the received request message. The response message comprises a mobile device identifier of the mobile device 2 and the nonce.

In transmission T2, the response message is transmitted by the ultra-wideband transceiver 20 of the mobile device 2 and received by the ultra-wideband transceiver 10 of the access control terminal 1.

In step S3, the electronic circuit 11 of the access control terminal 1 determines the distance d between the mobile device 2 and the access control terminal 1, if the nonce of the response message matches the nonce of the request message. In other embodiments, security protocols other than exchanging a nonce may be used to securely identify the mobile device 2 and determine the distance d in such a way as to secure against man-in-the-middle or side-channel attacks.

The distance d is determined by using a round trip time-of-flight calculation, using a time difference between sending the request message and receiving the response message. A processing time, indicating the time delay in the mobile device 2 of receiving the request message and transmitting the response message, is also used in determining the distance d. In an embodiment, the access control terminal 1 comprises a plurality of antennas 12, and determining the distance d further comprises determining the direction of the transmission by trilateration or by other geometric calculations, using the plurality of distances from the mobile device 2 to each of the antennas 12.

In step S4, the distance d is used to determine whether the mobile device 2 is within the proximity range P. If the mobile device 2 is not within the proximity range P, the access control terminal 1 reverts to step S1 and generates a new request message. In an embodiment, in transmitting a plurality of request messages and receiving a plurality of response messages, the access control terminal 1 determines a plurality of locations of the mobile device 2 which are associated with a specific time, and determines a path of the mobile device 2. By extrapolating the path, the access control terminal 1 predicts a future location of the mobile device 2 for determining whether the mobile device 2 will remain within the proximity range P for a given time.

In step S5, if the mobile device 2 is within the proximity range P or its predicted location is within the proximity range P, the processor 14 of the access control terminal 1 generates one or more update messages 131 for the respective mobile device 2 which is associated with the user. The update messages 131 comprise access rights data, which comprises access control point rights and access right times of the user of the mobile device 2. The update messages 131 are configured to update the access rights data 211 in the data store 21 of the mobile device 2. The update messages 131 are generated using the mobile phone identifier of the mobile device 2 received in the response message. The update messages 131 are generated by the processor 14 using access rights data received from an access rights authority 4 via the network 3. Depending on the data size of the received access rights data and the size of the data payload of an ultra-wideband transmission, the access rights data is partitioned into one or more update messages 131 by the processor 14. In an embodiment, the access rights authority 4 generates the update messages 131 and transmits them to access control terminal 1, which stores them in the data store 13. In the one or more transmissions T3 the update messages 131 are transmitted from the access control terminal 1 by the electronic circuit 11 and the ultra-wideband transceiver 10 to the mobile device 2 via the ultra-wideband transceiver 20 of the mobile device 2.

As the access rights data may be partitioned into a plurality of update messages 131, the access control terminal 1 determines in step S4, as described above, whether mobile device 2 or its predicted location, respectively, is inside the proximity range P before the access control terminal 1 begins transmitting the update messages 131. As the transmission and reception range of the ultra-wideband transmissions T3 is larger than the proximity range P, it is ensured that the update messages 131 are successfully received by the mobile device 2, even if the user of the mobile device 2 is not stationary during the transmitting of the update messages 131. The access control terminal 1 is configured to continue transmitting the update messages 131 even if the user of the mobile device 2 leaves the proximity range P during the transmitting of the update messages 131. This ensures a seamless update process as the user can be in motion while the access control terminal 1 transmits update messages 131.

The user does not have to handle or interact with the mobile device 2 for the mobile device 2 to receive the update messages 131. The user, carrying the mobile device 2, is only required to enter the proximity range P. In particular, the user does not have to present the mobile device 2 to the access rights terminal 1 for the mobile device 2 to receive the update messages 131. This makes receiving the update messages 131 user-friendly and efficient.

In step S6, the mobile device 2 updates the access rights data 211 using the received update messages 131. The received update messages comprise access rights data 211.

In an embodiment, in step S7, the mobile device 2 generates one more events data messages. The events data messages comprise events data 214 received from one or more access control points and stored in the data store 21.

In (optional) transmission T4, the mobile device 2 transmits the one or more events data messages which are received by the access control terminal 1. The access control terminal 1 forwards the events data 214 to the access rights authority 4 via the network 3. The mobile device 2 either transmits events data 214 to the access control terminal 1 while receiving the update messages 131 from the access control terminal 1, or transmits events data 214 to the access control terminal 1 independently from receiving the update messages 131. The events data 214 can also be transmitted from the mobile device 2 without receiving update messages 131.

The transmission of events data 214 from access control points to the access rights authority 4 via the data store 21 of the mobile device 2, the access control terminal 1 and the network 3, enables a system administrator to receive information including the status and access log files of access control points, without the access control points being directly connected to the network 3.

In step S8, after updating access rights data 211, the mobile device 2 generates a confirmation message comprising the mobile phone identifier of the mobile device 2 of the user. In transmission T5, the confirmation message is transmitted from the mobile device 2 and received by the access control terminal 1.

What is claimed is:

1. A physical access control terminal for access control points comprising:
   an electronic circuit; and
   an ultra-wideband transceiver connected to the electronic circuit;
   wherein the electronic circuit is configured to:
   transmit, via the ultra-wideband transceiver to a mobile device, a request message,
   receive, via the ultra-wideband transceiver from the mobile device, a response message,
   determine a distance of the mobile device from the physical access control terminal, using the response message, wherein the distance is from a physical location of the mobile device to a physical location of the physical access control terminal,
   determine, in the physical access control terminal, if the mobile device is within a pre-determined geometric proximity range of the physical access control terminal based at least in part on the distance, and
   based on a determination that the mobile device is within the pre-determined geometric proximity range of the physical access control terminal, transmit, from the physical access control terminal to the mobile device, one or more update messages configured to update access rights data in a data store of the mobile device, wherein the updated access rights data define user access rights for one or more access control points and grant a user of the mobile device access at certain access control points.

2. The physical access control terminal of claim 1, wherein the electronic circuit is configured to determine the distance using a time difference between transmitting the request message and receiving the response message.

3. The physical access control terminal of claim 1, wherein the electronic circuit is configured to include in the access rights data at least one of: access control point rights, which grant a user of the mobile device access at certain access control points, and access control point times, which grant the user of the mobile device access at certain access control points at certain times and/or for a certain periods of time.

4. The physical access control terminal of claim 1, wherein the electronic circuit is configured to transmit to the mobile device one or more update messages using at least one of: the ultra-wideband transceiver, a Bluetooth transceiver, a WLAN transceiver, a mobile cellular transceiver.

5. The physical access control terminal of claim 1, wherein the electronic circuit is further configured to determine and store a plurality of distances of the mobile device from the physical access control terminal, to determine, using the plurality of distances, a predicted path of the mobile device, and to transmit, via the ultra-wideband transceiver, the one or more update messages configured to update the access rights data in the mobile device, if the predicted path of the mobile device is within the proximity range for a predetermined update period.

6. A method of updating access rights between a physical access control terminal and a mobile device, the physical access control terminal comprising an electronic circuit and an ultra-wideband transceiver connected to the electronic circuit, wherein the method comprises:
   transmitting, by the electronic circuit via the ultra-wideband transceiver, a request message to the mobile device;
   receiving, by the electronic circuit via the ultra-wideband transceiver, a response message from the mobile device;
   determining, in the electronic circuit, using the response message, a distance of the mobile device from the physical access control terminal, wherein the distance is from a physical location of the mobile device to a physical location of the physical access control terminal;
   determining, in the electronic circuit, if the mobile device is within a pre-determined geometric proximity range of the physical access control terminal based at least in part on the distance; and
   based on a determination that the mobile device is within the pre-determined geometric proximity range of the physical access control terminal, transmitting, from the electronic circuit to the mobile device one or more update messages configured to update access rights data in a data store of the mobile device, wherein the updated access rights data define user access rights for one or more access control points and grant a user of the mobile device access at certain access control points.

7. The method of claim 6, wherein the method comprises determining, in the electronic circuit, the distance using a time difference between transmitting the request message and receiving the response message.

8. The method of claim 6, wherein the method comprises:
   including, by the electronic circuit, in the access rights data at least one of: access control point rights, which grant a user of the mobile device access at certain access control points, and access control point times, which grant the user of the mobile device access at certain access control points at certain times and/or for a certain periods of time.

9. The method of claim 6, wherein the method further comprises the electronic circuit transmitting, to the mobile device, one or more update messages via at least one of: the ultra-wideband transceiver, a Bluetooth transceiver, a WLAN transceiver, a mobile cellular transceiver.

10. The method of claim 6, wherein the method further comprises:
   determining and storing, in the electronic circuit, a plurality of distances of the mobile device from the physical access control terminal;
   determining, using the plurality of distances, a predicted path of the mobile device; and
   transmitting, via the ultra-wideband transceiver, the one or more update messages configured to update the access rights data in the mobile device, if the predicted path of the mobile device is within the proximity range for a predetermined update period.

11. A computer program product comprising a non-transitory computer readable medium having stored thereon computer code configured to control a processor of a physical access control terminal comprising an ultra-wideband transceiver, such that the processor performs the steps of:
   transmitting, via the ultra-wideband transceiver, a request message to a mobile device;
   receiving, via the ultra-wideband transceiver, a response message from the mobile device;
   determining, using the response message, a distance of the mobile device from the physical access control terminal, wherein the distance is from a physical location of the mobile device to a physical location of the physical access control terminal;
   determining, if the mobile device is within a pre-determined geometric proximity range of the physical access control terminal based at least in part on the distance; and
   based on a determination that the mobile device is within the pre-determined geometric proximity range of the physical access control terminal, transmitting to the mobile device one or more update messages configured to update access rights data in a data store of the mobile device, wherein the updated access rights data define user access rights for one or more access control points and grant a user of the mobile device access at certain access control points.

12. The computer program product of claim 11, wherein the computer code is configured to control the processor to perform the step of determining the distance using a time difference between transmitting the request message and receiving the response message.

13. The computer program product of claim 11, wherein the computer code is further configured to control the processor to perform the steps of:
   including in the access rights data at least one of: access control point rights, which grant a user of the mobile device access at certain access control points, and access control point times, which grant the user of the mobile device access at certain access control points at certain times and/or for a certain period of time.

14. The computer program product of claim 11, wherein the computer code is further configured to control the processor to perform the step of transmitting to the mobile device one or more update messages via at least one of: the ultra-wideband transceiver, a Bluetooth transceiver, a WLAN transceiver, a mobile cellular transceiver.

15. The computer program product of claim 11, wherein the computer code is further configured to control the processor to perform the steps of:
   determining and storing a plurality of distances of the mobile device from the physical access control terminal;
   determining, using the plurality of distances, a predicted path of the mobile device; and
   transmitting, via the ultra-wideband transceiver, the one or more update messages configured to update the access rights data in the mobile device, if the predicted path of the mobile device is within the proximity range for a predetermined update period.

\* \* \* \* \*